(12) United States Patent
Jones et al.

(10) Patent No.: US 11,859,819 B2
(45) Date of Patent: Jan. 2, 2024

(54) CERAMIC COMPOSITE COMBUSTOR DOME AND LINERS (71) Applicant: General Electric Company, Schenectady, NY (US)

(72) Inventors: Ryan Christopher Jones, West Chester, OH (US); Shai Birmaher, Cincinnati, OH (US); Nicholas John Bloom, Maineville, OH (US); Daniel J. Kirtley, Blue Ash, OH (US); Gerardo Antonio Salazar Lois, West Chester, OH (US); Anquan Wang, Mason, OH (US); Trevor James Hahm, Cincinnati, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 22 days.

(21) Appl. No.: 17/451,102

(22) Filed: Oct. 15, 2021

(65) Prior Publication Data
US 2023/0119008 A1 Apr. 20, 2023

(51) Int. Cl.
F23R 3/00 (2006.01)
F23R 3/60 (2006.01)
F02C 3/04 (2006.01)

(52) U.S. Cl.
CPC ............ F23R 3/002 (2013.01); F02C 3/04 (2013.01); F23R 3/007 (2013.01); F23R 3/60 (2013.01); F05D 2220/32 (2013.01); F05D 2240/35 (2013.01)

(58) Field of Classification Search
CPC .. F23R 3/002; F23R 3/007; F23R 3/50; F23R 3/60
See application file for complete search history.

(56) References Cited

U.S. PATENT DOCUMENTS

| 3,854,285 | A | 12/1974 | Stenger et al. |
| 3,990,232 | A | 11/1976 | Campbell |
| 4,222,230 | A | 9/1980 | Bobo et al. |
| 4,543,781 | A | 10/1985 | Rice |
| 4,686,823 | A | 8/1987 | Coburn et al. |
| 5,142,871 | A | 9/1992 | Lampes et al. |
| 5,154,060 | A | 10/1992 | Walker et al. |
| 5,181,379 | A | 1/1993 | Wakeman et al. |
| 5,197,278 | A | 3/1993 | Sabla et al. |
| 5,197,289 | A | 3/1993 | Glevicky et al. |
| 5,233,828 | A | 8/1993 | Napoli |
| 5,241,827 | A | 9/1993 | Lampes |

(Continued)

FOREIGN PATENT DOCUMENTS

| CA | 2608623 C | 12/2014 |
| CA | 2610263 C | 1/2015 |

(Continued)

Primary Examiner — Scott J Walthour
(74) Attorney, Agent, or Firm — Venable LLP; Aziz H. Poonawalla; Michele V. Frank (57) ABSTRACT A combustor for a turbomachine engine includes a dome made of a ceramic matrix composite (CMC) material, the dome being secured within a support structure. The combustor includes an outer liner made of the CMC material, the outer liner being secured to the dome within the support structure. The combustor also includes an inner liner made of the CMC material, the inner liner being secured to the dome within the support structure.

20 Claims, 10 Drawing Sheets

(56) References Cited

U.S. PATENT DOCUMENTS

| | | | |
|---|---|---|---|
| 5,261,223 A | 11/1993 | Foltz | |
| 5,279,127 A | 1/1994 | Napoli | |
| 5,285,632 A | 2/1994 | Halila | |
| 5,289,687 A | 3/1994 | Kress et al. | |
| 5,291,732 A | 3/1994 | Halila | |
| 5,291,733 A * | 3/1994 | Halila | F23R 3/60 60/753 |
| 5,307,637 A | 5/1994 | Stickles et al. | |
| 5,329,761 A | 7/1994 | Ablett et al. | |
| 5,353,587 A | 10/1994 | Halila | |
| 5,687,572 A | 11/1997 | Schrantz et al. | |
| 5,727,378 A | 3/1998 | Seymour | |
| 5,970,716 A | 10/1999 | Forrester et al. | |
| 5,987,889 A | 11/1999 | Graves et al. | |
| 6,047,539 A | 4/2000 | Farmer | |
| 6,148,600 A * | 11/2000 | Farmer | F23R 3/002 60/804 |
| 6,212,870 B1 | 4/2001 | Thompson et al. | |
| 6,279,323 B1 | 8/2001 | Monty et al. | |
| 6,286,298 B1 | 9/2001 | Burrus et al. | |
| 6,295,801 B1 | 10/2001 | Burrus et al. | |
| 6,298,667 B1 | 10/2001 | Glynn et al. | |
| 6,334,298 B1 | 1/2002 | Aicholtz | |
| 6,427,446 B1 | 8/2002 | Kraft et al. | |
| 6,449,952 B1 | 9/2002 | Emilianowicz et al. | |
| 6,474,070 B1 | 11/2002 | Danis et al. | |
| 6,505,673 B1 | 1/2003 | Abuaf et al. | |
| 6,513,330 B1 | 2/2003 | Rice et al. | |
| 6,546,733 B2 | 4/2003 | North et al. | |
| 6,557,350 B2 | 5/2003 | Farmer et al. | |
| 6,568,079 B2 | 5/2003 | Farmer et al. | |
| 6,581,386 B2 | 6/2003 | Young et al. | |
| 6,644,034 B2 | 11/2003 | Ariyoshi et al. | |
| 6,684,642 B2 | 2/2004 | Willis et al. | |
| 6,725,667 B2 | 4/2004 | Farmer et al. | |
| 6,735,950 B1 | 5/2004 | Howell et al. | |
| 6,758,045 B2 | 7/2004 | Dimov et al. | |
| 6,775,985 B2 | 8/2004 | Mitchell et al. | |
| 6,779,268 B1 | 8/2004 | Farmer | |
| 6,782,620 B2 | 8/2004 | Caldwell et al. | |
| 6,792,757 B2 | 9/2004 | Borns et al. | |
| 6,823,676 B2 | 11/2004 | Conete et al. | |
| 6,851,263 B2 | 2/2005 | Stumpf et al. | |
| 6,863,738 B2 | 3/2005 | Kool et al. | |
| 6,868,675 B1 | 3/2005 | Kuhn et al. | |
| 6,871,501 B2 | 3/2005 | Bibler et al. | |
| 6,895,757 B2 | 5/2005 | Mitchell et al. | |
| 6,895,761 B2 | 5/2005 | Mitchell et al. | |
| 6,904,676 B2 | 6/2005 | Emilianowicz | |
| 6,904,757 B2 | 6/2005 | Mitchell et al. | |
| 6,910,620 B2 | 6/2005 | Hasz et al. | |
| 6,920,762 B2 | 7/2005 | Wells et al. | |
| 6,931,728 B2 | 8/2005 | Howard et al. | |
| 6,931,862 B2 | 8/2005 | Harris | |
| 6,933,052 B2 | 8/2005 | Gorman et al. | |
| 6,955,038 B2 | 10/2005 | McCaffrey et al. | |
| 6,955,053 B1 | 10/2005 | Chen et al. | |
| 6,968,699 B2 | 11/2005 | Howell et al. | |
| 6,976,363 B2 | 12/2005 | McMasters et al. | |
| 6,983,599 B2 | 1/2006 | Young et al. | |
| 6,986,201 B2 | 1/2006 | Moertel et al. | |
| 7,036,316 B2 | 5/2006 | Howell et al. | |
| 7,093,419 B2 | 8/2006 | McCaffrey et al. | |
| 7,093,440 B2 | 8/2006 | Howell et al. | |
| 7,124,487 B2 | 10/2006 | Kuhn et al. | |
| 7,246,494 B2 | 7/2007 | Currin et al. | |
| 7,308,794 B2 | 12/2007 | Morenko et al. | |
| 7,325,403 B2 | 2/2008 | Currin et al. | |
| 7,340,900 B2 | 3/2008 | Xu et al. | |
| 7,360,364 B2 | 4/2008 | Danis et al. | |
| 7,441,409 B2 | 10/2008 | Patel et al. | |
| 7,451,600 B2 | 11/2008 | Patel et al. | |
| 7,500,364 B2 | 3/2009 | Schumacher et al. | |
| 7,506,512 B2 | 3/2009 | Schumacher et al. | |
| 7,571,611 B2 | 8/2009 | Johnson et al. | |
| 7,596,949 B2 | 10/2009 | DeVane et al. | |
| 7,665,306 B2 | 2/2010 | Bronson et al. | |
| 7,716,931 B2 | 5/2010 | Mancini et al. | |
| 7,730,725 B2 | 6/2010 | Faulder et al. | |
| 7,765,809 B2 | 8/2010 | Brown et al. | |
| 7,845,174 B2 | 12/2010 | Parkman et al. | |
| 7,856,826 B2 | 12/2010 | Brown et al. | |
| 7,966,821 B2 | 6/2011 | Zupanc et al. | |
| 7,975,487 B2 | 7/2011 | Lockyer et al. | |
| 8,001,793 B2 | 8/2011 | Patel et al. | |
| 8,021,491 B2 | 9/2011 | Kool et al. | |
| 8,056,346 B2 | 11/2011 | Lockyer et al. | |
| 8,141,370 B2 | 3/2012 | Bulman et al. | |
| 8,281,597 B2 | 10/2012 | Li et al. | |
| 8,327,538 B2 | 12/2012 | Wang et al. | |
| 8,631,557 B2 | 1/2014 | Elfizy et al. | |
| 8,726,669 B2 | 5/2014 | Brown et al. | |
| 8,745,989 B2 | 6/2014 | Prociw et al. | |
| 8,904,800 B2 | 12/2014 | Patel et al. | |
| 8,943,835 B2 | 2/2015 | Corsmeier et al. | |
| 9,027,350 B2 | 5/2015 | Roesler | |
| 9,080,770 B2 | 7/2015 | Dudebout et al. | |
| 9,134,028 B2 | 9/2015 | Stastny et al. | |
| 9,347,669 B2 | 5/2016 | Stuttaford et al. | |
| 9,400,110 B2 | 7/2016 | Dudebout et al. | |
| 9,410,702 B2 | 8/2016 | Dudebout et al. | |
| 9,416,972 B2 | 8/2016 | Hawie et al. | |
| 9,518,739 B2 | 12/2016 | Hu et al. | |
| 9,599,344 B2 | 3/2017 | Bunel et al. | |
| 9,625,156 B2 | 4/2017 | Rudrapatna et al. | |
| 9,644,843 B2 | 5/2017 | Herborth | |
| 9,752,781 B2 | 9/2017 | Stuttaford et al. | |
| 9,803,554 B2 | 10/2017 | Martinez Fabre et al. | |
| 9,869,473 B2 | 1/2018 | Elkady et al. | |
| 9,958,161 B2 | 5/2018 | Prociw et al. | |
| 9,964,309 B2 | 5/2018 | Corsmeier et al. | |
| 9,976,746 B2 | 5/2018 | Bloom et al. | |
| 9,982,890 B2 | 5/2018 | Papple et al. | |
| 10,012,385 B2 | 7/2018 | Hayek et al. | |
| 10,041,413 B2 | 8/2018 | Huang et al. | |
| 10,041,676 B2 | 8/2018 | Patel et al. | |
| 10,041,679 B2 | 8/2018 | Prociw | |
| 10,072,846 B2 | 9/2018 | Monahan et al. | |
| 10,101,030 B2 | 10/2018 | Dudebout et al. | |
| 10,156,189 B2 | 12/2018 | Sze et al. | |
| 10,168,051 B2 | 1/2019 | Bloom et al. | |
| 10,197,278 B2 | 2/2019 | Bloom et al. | |
| 10,197,279 B2 | 2/2019 | Boardman et al. | |
| 10,222,065 B2 | 3/2019 | Hannwacker et al. | |
| 10,228,126 B2 | 3/2019 | Wadhwa et al. | |
| 10,228,136 B2 | 3/2019 | Hannwacker et al. | |
| 10,267,523 B2 | 4/2019 | Metternich et al. | |
| 10,280,760 B2 | 5/2019 | Joshi et al. | |
| 10,281,153 B2 | 5/2019 | Hannwacker et al. | |
| 10,317,085 B2 | 6/2019 | Hannwacker et al. | |
| 10,337,738 B2 | 7/2019 | Boardman et al. | |
| 10,371,382 B2 | 8/2019 | Corsmeier | |
| 10,371,383 B2 | 8/2019 | Reynolds et al. | |
| 10,378,769 B2 | 8/2019 | Radwanski et al. | |
| 10,378,770 B2 | 8/2019 | Reynolds et al. | |
| 10,378,771 B2 | 8/2019 | Hannwacker et al. | |
| 10,378,772 B2 | 8/2019 | Stieg et al. | |
| 10,378,775 B2 | 8/2019 | Patel et al. | |
| 10,385,709 B2 | 8/2019 | Reynolds et al. | |
| 10,385,776 B2 | 8/2019 | Reynolds et al. | |
| 10,393,380 B2 | 8/2019 | Riehle | |
| 10,393,381 B2 | 8/2019 | Noe et al. | |
| 10,428,736 B2 | 10/2019 | Hannwacker et al. | |
| 10,429,070 B2 | 10/2019 | Hannwacker et al. | |
| 10,436,446 B2 | 10/2019 | Dery | |
| 10,465,610 B2 | 11/2019 | Huang et al. | |
| 10,473,332 B2 | 11/2019 | Hannwacker et al. | |
| 10,495,310 B2 | 12/2019 | Corsmeier | |
| 10,520,197 B2 | 12/2019 | Dziech et al. | |
| 10,571,128 B2 | 2/2020 | Jorgensen et al. | |
| 10,598,380 B2 | 3/2020 | Lind et al. | |
| 10,648,669 B2 | 5/2020 | Varney et al. | |
| 10,663,167 B2 | 5/2020 | Dziech | |
| 10,677,465 B2 | 6/2020 | Venturato et al. | |

(56) References Cited

U.S. PATENT DOCUMENTS

| | | |
|---|---|---|
| 10,690,347 B2 | 6/2020 | Reynolds et al. |
| 10,697,634 B2 | 6/2020 | Haeny et al. |
| 10,712,002 B2 | 7/2020 | Masquelet et al. |
| 10,718,525 B2 | 7/2020 | Jorgensen et al. |
| 10,731,859 B2 | 8/2020 | Prociw et al. |
| 10,760,792 B2 | 9/2020 | Patel et al. |
| 10,801,726 B2 | 10/2020 | Stevens et al. |
| 10,816,199 B2 | 10/2020 | Corsmeier |
| 10,816,202 B2 | 10/2020 | Amble et al. |
| 10,816,213 B2 | 10/2020 | Jones et al. |
| 10,823,419 B2 | 11/2020 | Jones et al. |
| 10,823,421 B2 | 11/2020 | Giambra et al. |
| 10,823,422 B2 | 11/2020 | Johnson et al. |
| 10,837,640 B2 | 11/2020 | Patel et al. |
| 10,851,996 B2 | 12/2020 | DeBruhl |
| 10,928,067 B2 | 2/2021 | Sze et al. |
| 10,955,140 B2 | 3/2021 | Morenko |
| 10,982,851 B2 | 4/2021 | Bellardi |
| 10,982,852 B2 | 4/2021 | Sauer et al. |
| 11,022,313 B2 | 6/2021 | Boardman et al. |
| 2004/0035115 A1* | 2/2004 | Farmer ............... F23R 3/50 60/752 |
| 2005/0241316 A1 | 11/2005 | Nguyen et al. |
| 2006/0130486 A1 | 6/2006 | Danis et al. |
| 2006/0138195 A1 | 6/2006 | Hasz et al. |
| 2007/0157618 A1 | 7/2007 | Manteiga et al. |
| 2007/0245710 A1 | 10/2007 | Schumacher et al. |
| 2008/0011813 A1 | 1/2008 | Bucci et al. |
| 2009/0090110 A1 | 4/2009 | Pardington et al. |
| 2009/0199563 A1 | 8/2009 | Chen |
| 2010/0031664 A1 | 2/2010 | Emilianowicz |
| 2010/0095679 A1 | 4/2010 | Rudrapatna et al. |
| 2010/0095680 A1 | 4/2010 | Rudrapatna et al. |
| 2010/0237134 A1 | 9/2010 | Bucci et al. |
| 2013/0152591 A1 | 6/2013 | Dery et al. |
| 2013/0174562 A1 | 7/2013 | Holcomb et al. |
| 2013/0272916 A1* | 10/2013 | Richardson ............ C22C 19/07 420/435 |
| 2014/0260297 A1 | 9/2014 | Prociw et al. |
| 2014/0260298 A1 | 9/2014 | Prociw et al. |
| 2014/0318139 A1 | 10/2014 | Metternich et al. |
| 2014/0318140 A1 | 10/2014 | Metternich et al. |
| 2015/0107256 A1 | 4/2015 | Prociw et al. |
| 2016/0146464 A1 | 5/2016 | Pasqualotto et al. |
| 2016/0320064 A1 | 11/2016 | Hawie et al. |
| 2017/0003032 A1 | 1/2017 | Jorgensen et al. |
| 2017/0059167 A1* | 3/2017 | Bloom .................. F23R 3/007 |
| 2017/0089581 A1 | 3/2017 | Lao et al. |
| 2017/0191664 A1 | 7/2017 | Bennett |
| 2017/0248315 A1* | 8/2017 | Hannwacker ......... F23R 3/007 |
| 2017/0370583 A1 | 12/2017 | Marusko et al. |
| 2018/0051880 A1 | 2/2018 | Stieg et al. |
| 2018/0313540 A1 | 11/2018 | Nagaraja et al. |
| 2018/0320900 A1 | 11/2018 | Duncan et al. |
| 2018/0363903 A1* | 12/2018 | Dziech ................. F23R 3/007 |
| 2019/0017441 A1 | 1/2019 | Venkatesan et al. |
| 2019/0056110 A1 | 2/2019 | Stevens et al. |
| 2019/0063751 A1 | 2/2019 | Ryon et al. |
| 2019/0063752 A1 | 2/2019 | Stevens et al. |
| 2019/0063753 A1 | 2/2019 | Stevens et al. |
| 2019/0085767 A1 | 3/2019 | Vise et al. |
| 2019/0101062 A1 | 4/2019 | Vise et al. |
| 2019/0137101 A1 | 5/2019 | Bloom et al. |
| 2019/0162117 A1 | 5/2019 | Wang et al. |
| 2019/0186369 A1 | 6/2019 | Lowery et al. |
| 2019/0203611 A1 | 7/2019 | Stieg et al. |
| 2019/0203939 A1 | 7/2019 | Stieg et al. |
| 2019/0203940 A1 | 7/2019 | Stieg et al. |
| 2019/0271469 A1 | 9/2019 | Jones et al. |
| 2019/0309948 A1 | 10/2019 | Prociw et al. |
| 2019/0338676 A1 | 11/2019 | Kerns et al. |
| 2019/0368422 A1 | 12/2019 | Lowery et al. |
| 2020/0003418 A1 | 1/2020 | Stieg et al. |
| 2020/0025377 A1 | 1/2020 | Noe et al. |
| 2020/0063583 A1* | 2/2020 | Bilse .................. F01D 9/023 |
| 2020/0063961 A1 | 2/2020 | Jones et al. |
| 2020/0080723 A1 | 3/2020 | Corsmeier |
| 2020/0132303 A1 | 4/2020 | Prociw et al. |
| 2020/0166211 A1 | 5/2020 | Dudebout et al. |
| 2020/0173661 A1 | 6/2020 | Hu et al. |
| 2020/0284433 A1 | 9/2020 | Kamoi et al. |
| 2020/0292174 A1 | 9/2020 | Dziech et al. |
| 2020/0333007 A1 | 10/2020 | Reynolds et al. |
| 2021/0003281 A1 | 1/2021 | Amble et al. |
| 2021/0003283 A1 | 1/2021 | Baranowicz et al. |
| 2021/0025595 A1 | 1/2021 | Prenter et al. |
| 2021/0063016 A1 | 3/2021 | Stieg et al. |
| 2021/0102498 A1 | 4/2021 | Huang et al. |
| 2021/0102701 A1 | 4/2021 | Freeman et al. |
| 2021/0102702 A1 | 4/2021 | Freeman et al. |
| 2021/0108799 A1 | 4/2021 | Freeman et al. |
| 2023/0112117 A1* | 4/2023 | Salazar Lois ............ F23R 3/38 60/722 |

FOREIGN PATENT DOCUMENTS

| | | |
|---|---|---|
| CN | 109416180 A | 3/2019 |
| EP | 1152191 B1 | 9/2006 |
| EP | 2246623 A1 | 11/2010 |
| EP | 1811231 B1 | 12/2016 |
| EP | 3115690 A1 | 1/2017 |
| EP | 3139093 A1 | 3/2017 |
| EP | 2570520 B1 | 11/2017 |
| EP | 3317585 A1 | 5/2018 |
| EP | 2690364 B1 | 11/2018 |
| EP | 3109557 B1 | 1/2019 |
| EP | 3495737 A2 | 6/2019 |
| EP | 3221643 B1 | 2/2020 |
| FR | 2871847 B1 | 9/2006 |
| FR | 3084446 A1 | 1/2020 |
| GB | 2125950 A | 3/1984 |
| GB | 2453853 B | 11/2012 |
| GB | 2503184 B | 7/2014 |
| JP | 2233907 A | 9/1990 |
| JP | 4283317 A | 10/1992 |
| JP | 4288412 A | 10/1992 |
| JP | 4295517 A | 10/1992 |
| JP | 5187636 A | 7/1993 |
| JP | 6094238 A | 4/1995 |
| JP | 9053822 A | 2/1997 |
| SE | 199102686 L | 7/1992 |
| WO | 2006021097 A1 | 3/2006 |
| WO | 2017002076 A1 | 1/2017 |

* cited by examiner

CERAMIC COMPOSITE COMBUSTOR DOME AND LINERS

TECHNICAL FIELD

The present disclosure relates to turbomachine engines, including combustors.

BACKGROUND

Combustors in turbomachine engines receive a mixture of fuel and highly compressed air, which is ignited to produce hot combustion gases. These hot gases are used to provide a torque in a turbine to provide mechanical power and thrust. A typical combustor layout is at least partially constructed of metal, which has high weight, and which requires multiple wall construction and high levels of cooling in order to protect the combustor from extremely high temperatures. The expansion of the metal at high temperatures also creates gaps that interfere with airflow and reduces fuel efficiency.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first", "second", and "third" may be used interchangeably to distinguish one component from another and are not intended to signify location or importance of the individual components.

The terms "forward" and "aft" refer to relative positions within a turbomachine engine or vehicle, and refer to the normal operational attitude of the turbomachine engine or vehicle. For example, with regard to a gas turbine engine, forward refers to a position closer to an engine inlet and aft refers to a position closer to an engine nozzle or exhaust.

The terms "outer" and "inner" refer to relative positions within a turbomachine engine, from a centerline axis of the engine. For example, outer refers to a position further from the centerline axis and inner refers to a position closer to the centerline axis.

The terms "coupled," "fixed," "attached to," and the like, refer to both direct coupling, fixing, or attaching, as well as indirect coupling, fixing, or attaching through one or more intermediate components or features, unless otherwise specified herein.

This disclosure and various embodiments relate to a turbomachine engine, also referred to as a gas turbine engine, a turboprop engine, or a turbomachine. These turbomachine engines can be applied across various technologies and industries. Various embodiments may be described herein in the context of aeronautical engines and aircraft machinery.

In some instances, a turbomachine engine is configured as a direct drive engine. In other instances, a turbomachine engine can be configured as a geared engine with a gearbox. In some instances, a propulsor of a turbomachine engine can be a fan encased within a fan case and/or nacelle. This type of turbomachine engine can be referred to as "a ducted engine." In other instances, a propulsor of a turbomachine engine can be exposed (e.g., not within a fan case or a nacelle). This type of turbomachine engine can be referred to as "an open rotor engine" or an "unducted engine."

The use of ceramic matrix composites (CMC) is desirable in combustor design, since CMC materials have far higher heat capacity than metal. Though some combustor designs have utilized CMC for portions of the combustor, these still rely on metal for the dome and other combustor components. The advantages of an all-CMC design are reduced cooling, weight reduction, and shorter combustor length, due to replacement of the heavier metal components and simplified internal design. Compared to partial-CMC combustor designs, an all-CMC design also potentially provides improved airflow control by eliminating attachment gaps between the dome and the liners, reduced weight by eliminating additional deflectors, and reduced cooling on the dome.

Some embodiments of the present disclosure provide an all-CMC design for the dome and the liners of a combustor in a turbomachine engine. The design includes specialized mounting hardware design to prevent damage from direct metal-on-CMC contact between the support structure of the engine and the CMC dome and liners, as well as provides flexibility and maintains separation and position of the CMC components relative to each other during heat-induced expansion of the surrounding metallic engine and combustor components.

Figure 1:
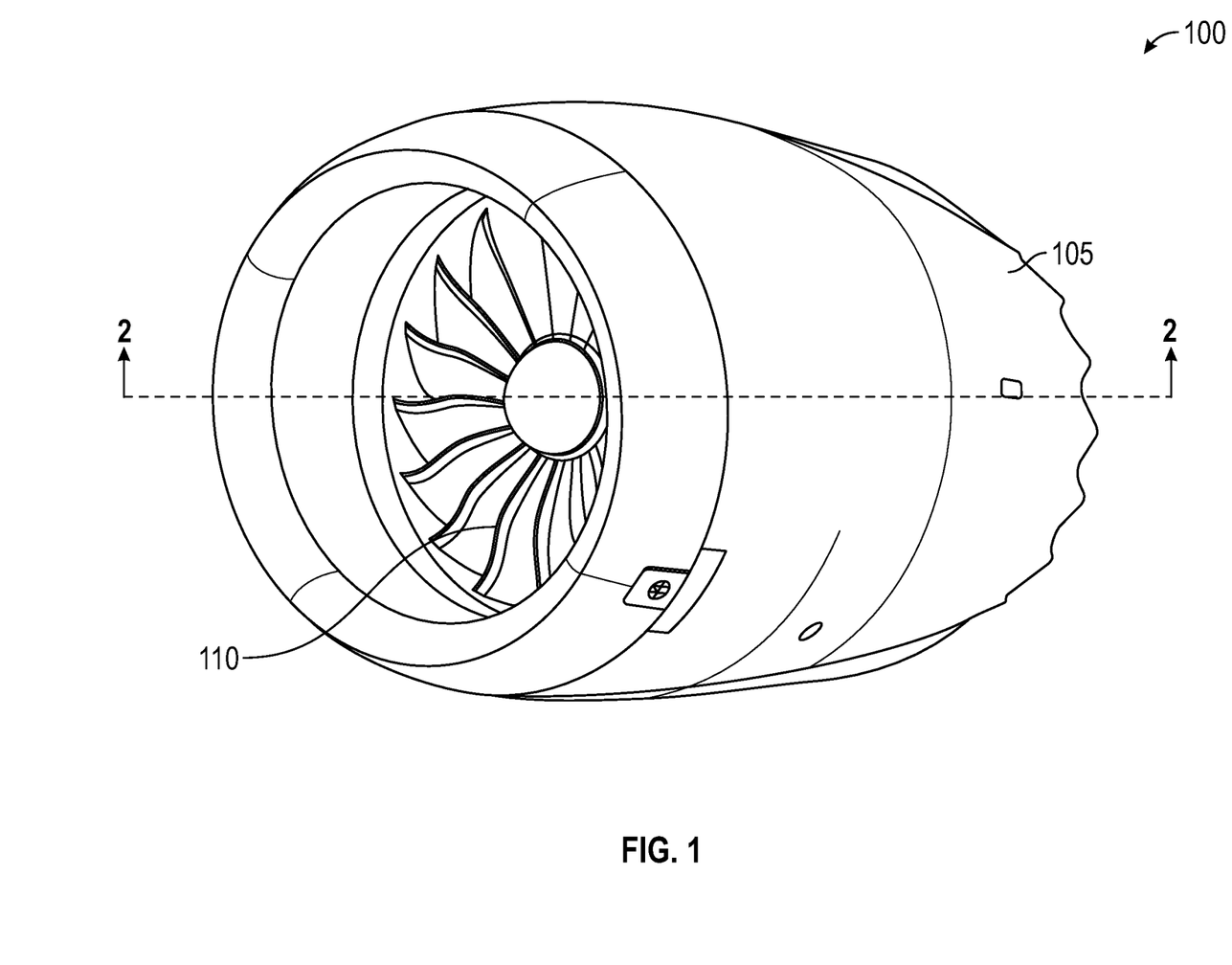
FIG. 1 shows an example of an aeronautical turbomachine engine.

FIG. 1 shows an example of a turbomachine engine 100, according to an embodiment of the present disclosure. Types of such engines include turboprops, turbofans, turbomachines, and turbojets. The turbomachine engine 100 is covered by a protective cowl 105, so that the only component visible in this exterior view is a fan assembly 110. A nozzle, not shown in FIG. 1, also protrudes from the aft end of the turbomachine engine 100 beyond the protective cowl 105.

Figure 2:
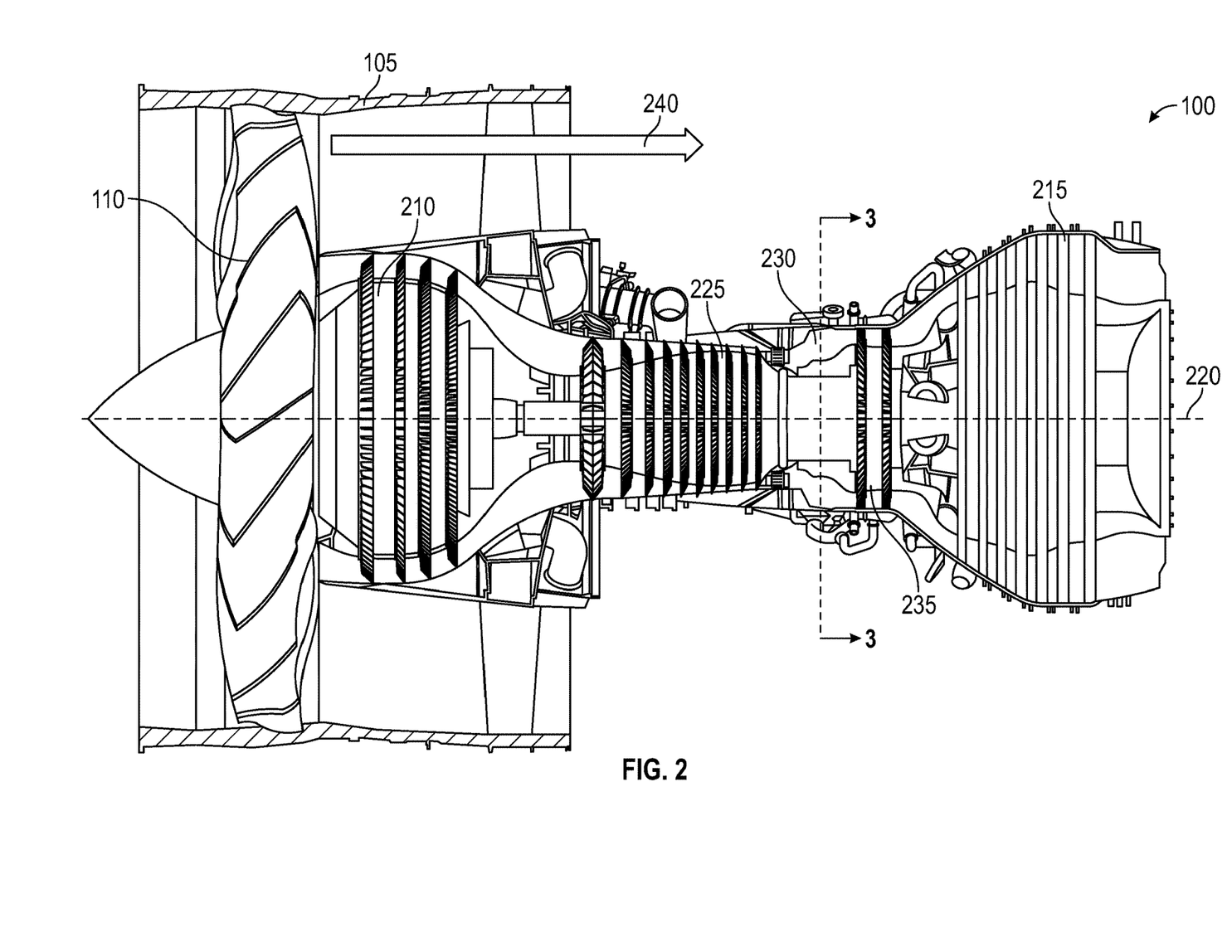
FIG. 2 shows a schematic, cross-sectional view of a combustor taken along line 2-2 of the turbomachine engine shown in FIG. 1.

FIG. 2 shows a schematic, cross-sectional view taken along line 2-2 of the turbomachine engine 100 shown in FIG. 1, which may incorporate one or more embodiments of the present disclosure. In this example, the turbomachine engine 100 is a two-spool turbomachine that includes a high-speed system and a low-speed system, both of which are partially covered by the protective cowl 105. The low-speed system of the turbomachine engine 100 includes the fan assembly 110, a low-pressure compressor 210 (also referred to as a booster), and a low-pressure turbine 215, all of which are connected by a low-speed shaft (not shown in FIG. 2) that extends along the centerline axis 220 of the turbomachine engine 100. The fan assembly 110, the low-pressure compressor 210, and the low-pressure turbine 215 all rotate in unison about the centerline axis 220.

The high-speed system of the turbomachine engine 100 includes a high-pressure compressor 225, a combustor 230, and a high-pressure turbine 235, all of which are connected by a high-speed shaft (not shown in FIG. 2) that extends along the centerline axis 220 of the turbomachine engine 100. The high-pressure compressor 225 and the high-pressure turbine 235 rotate in unison about the centerline axis 220, at a different rotational speed than the rotation of the low-pressure components (and in some embodiments, at a higher rotational speed, and/or a counter-rotating direction, relative to the low-pressure system).

The components of the low-pressure system and the high pressure system are positioned so that a portion of the air intake by the turbomachine engine 100 flows through the turbomachine engine 100 from fore to aft through the fan assembly 110, the low-pressure compressor 210, the high-pressure compressor 225, the combustor 230, the high-pressure turbine 235, and the low-pressure turbine 215. Another portion of the air intake by the turbomachine engine 100 bypasses the low-pressure system and the high-pressure system, and flows from fore to aft along arrow 240.

The combustor 230 is located between the high-pressure compressor 225 and the high-pressure turbine 235. The combustor 230 can include one or more configurations for receiving a mixture of fuel from a fuel system (not shown in FIG. 2) and air from the high-pressure compressor 225. This mixture is ignited, creating hot combustion gases that flow from fore to aft through the high-pressure turbine 235, which provides a torque to rotate the high-pressure shaft and thereby rotate the high-pressure compressor 225. After exiting the high-pressure turbine, the combustion gases continue to flow from fore to aft through the low-pressure turbine 215, which provides a torque to rotate the low-pressure shaft and thereby rotate the low-pressure compressor 210 and the fan assembly 110.

In other words, the forward stages of the turbomachine engine 100, namely, the fan assembly 110, the low-pressure compressor 210, and the high-pressure compressor 225, all prepare the intake air for ignition. The forward stages all require power in order to rotate. The rear stages of the turbomachine engine 100, namely, the combustor 230, the high-pressure turbine 235, and the low-pressure turbine 215, provide that requisite power, by igniting the compressed air and using the resulting hot combustion gases to rotate the low-pressure and the high-pressure shafts (also referred to as rotors). In this manner, the rear stages use air to physically drive the front stages, and the front stages are driven to provide air to the rear stages.

As the exhaust gas exits out the aft end of the rear stages, the exhaust gas reaches the nozzle at the aft end of the turbomachine engine 100 (not shown in FIG. 2). When the exhaust passes over the nozzle, and combines with the bypassed air, an exhaust force is created that is the thrust generated by the turbomachine engine 100.

Figure 3:
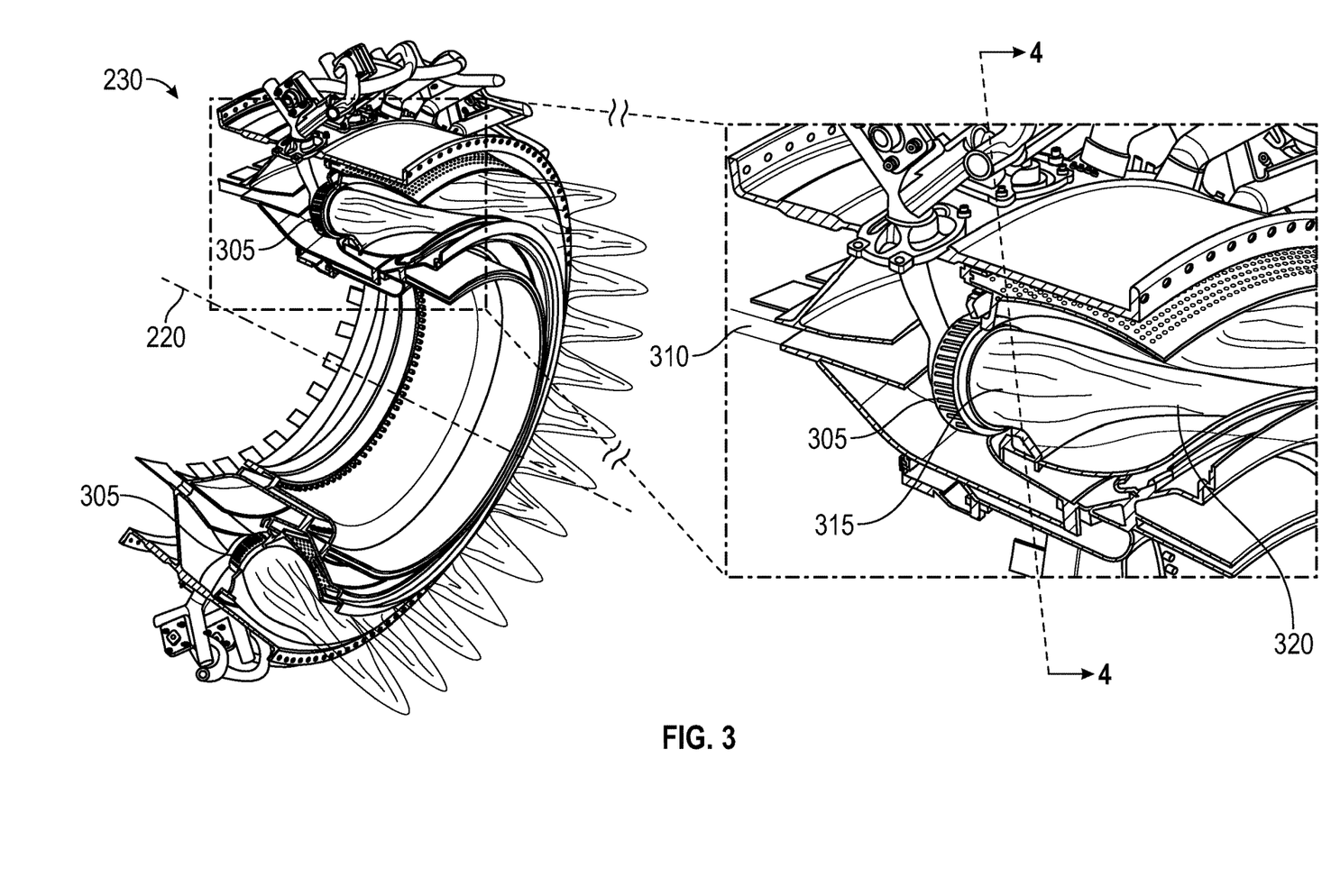
FIG. 3 shows a schematic, cross-sectional view of a combustion chamber taken along line 3-3 of the combustor shown in FIG. 2.

FIG. 3 shows a schematic, cross-sectional view taken along line 3-3 of the combustor 230 of the turbomachine engine 100 shown in FIG. 2. The combustor 230 has axial symmetry about the centerline axis 220, with an annular ring of fuel nozzles 305 spaced along the circumference and facing in the aft direction. Compressed air 310 from the front stages of the turbomachine engine 100 flows into the combustor and mixes in a combustion chamber 315 with fuel from the fuel nozzles 305. The fuel-air mixture is ignited in the combustion chamber 315 to produce a steady flow of combustion gases 320 that enter the turbines in the rear stages (not shown in FIG. 4).

Figure 4:
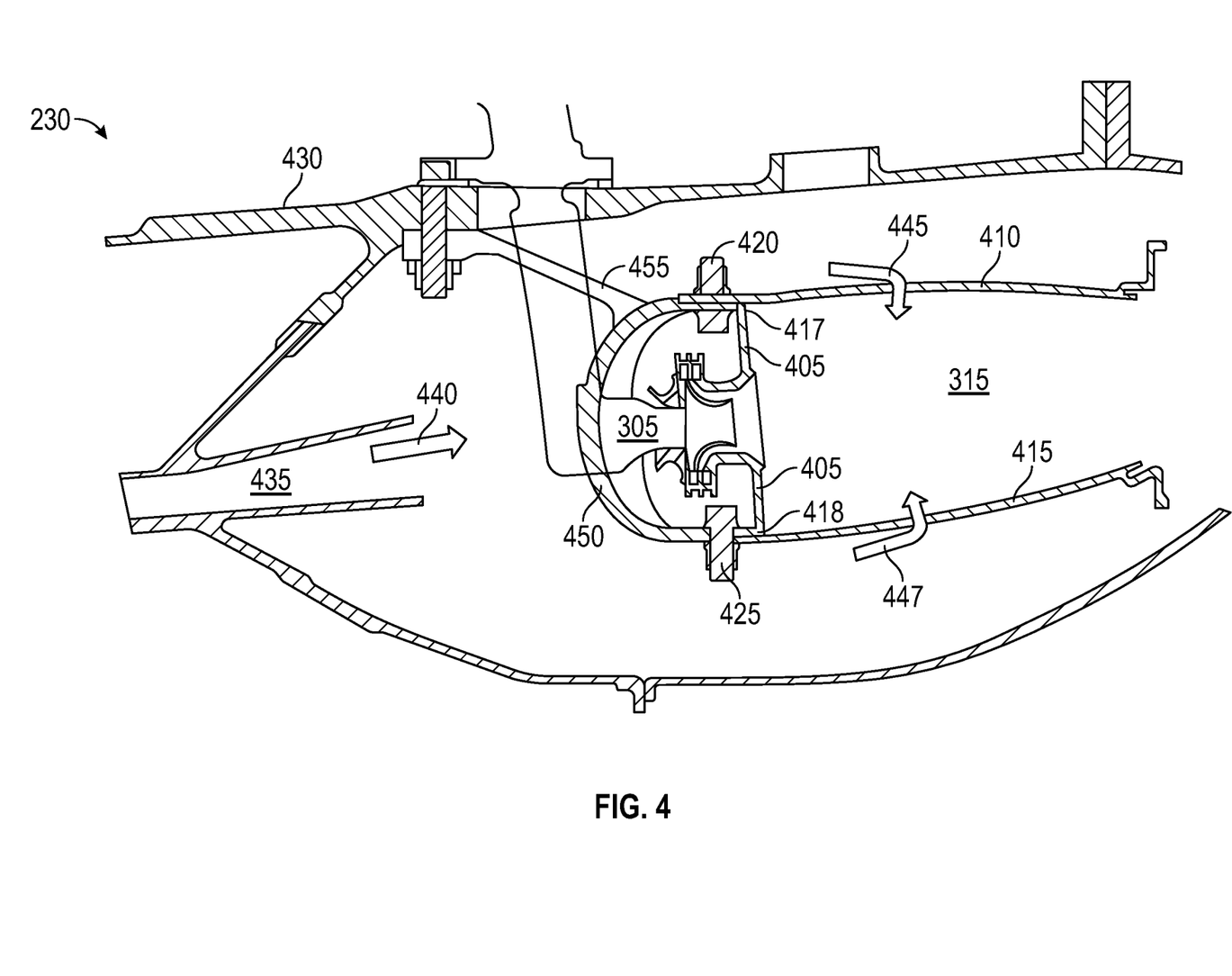
FIG. 4 shows a schematic, cross-sectional view of a combustion chamber taken along line 4-4 of the combustor shown in FIG. 3.

FIG. 4 shows a schematic, cross-sectional view of the combustion chamber 315 taken along line 4-4 of the combustor 230 shown in FIG. 3. The combustion chamber 315 is an annular open space around the centerline axis 220, that is defined at the forward end by a dome 405, which supports and positions the fuel nozzle 305, as well as an outer liner 410 and an inner liner 415 on the outer and inner annular surfaces, respectively. The outer liner 410 and the inner liner 415 are coaxial cylinders around the centerline axis 220 (not shown in FIG. 4), the outer liner 410 being spaced radially from the inner liner 415. The dome 405 forms an annular wall oriented perpendicular to and coaxial with the centerline axis 220, with orifices spaced along the circumference to receive each fuel nozzle 305. Because of its proximity to the combustion chamber, hot gases, and the extreme temperatures produced therein, the dome must be configured to withstand a harsh environment. The combustion chamber 315 is open in the aft direction, to allow combustion gases to flow towards the high-pressure turbine 235 (not shown in FIG. 4).

The outer liner 410 and the inner liner 415 have a cylindrical shape with rotational symmetry around the centerline axis 220 (not shown in FIG. 4), the outer liner 410 having a radius greater than that of the inner liner 415. Both the outer liner 410 and the inner liner 415 extend in the aft direction along the centerline axis 220.

In the example of FIG. 4, the dome 405, the outer liner 410, and the inner liner 415 are all made of metal. Accordingly, the dome 405 and the outer liner 410 are coupled together at an outer flange 417 of the dome 405 with an outer array 420 of fasteners, and the dome 405 and the inner liner 415 are coupled together at an inner flange 418 of the dome 405 with an inner array 425 of fasteners. These fasteners may include one or more of pins, bolts, nuts, nut plates, screws, and any other suitable fasteners.

The outer array 420 and the inner array 425 also serve to couple the dome 405, the outer liner 410, and the inner liner 415 to a combustor case 430 of the combustor 230. Note that, in this example, since the dome 405, the outer liner 410, and the inner liner 415 are all made of metal, the fasteners couple directly to these components.

The combustor case 430 defines an inlet 435 for compressed air to flow from the high-pressure compressor 225 (not shown in FIG. 4, along arrow 440) and into the combustion chamber 315 around the fuel nozzle 305. The air also flows into the combustion chamber 315 through airflow holes (not shown in FIG. 4) in the outer liner 410 (e.g., along arrow 445) and the inner liner 415 (e.g., along arrow 447). In addition, one or more heat shields and/or deflectors (not shown in FIG. 4) may also be provided on the dome 405 to help protect the dome 405 from the heat of the combustion gases.

In addition, the combustor case 430 supports the dome 405 with a mounting arm 455 that connects to a structural cowl mount 450, which has an annular symmetry about the centerline axis 220, forming an aft-facing channel to receive the dome 405, and having a forward-facing aperture to receive the fuel nozzle 305. The structural cowl mount 450 is coupled directly to the outer flange 417 and the inner flange 418 of the dome 405 by the outer array 420 of fasteners and the inner array 425 of fasteners, respectively.

In some embodiments, non-traditional non-metallic high temperature materials, such as ceramic matrix composites (CMCs), may be used for various components within turbomachine engines. Because CMC materials can withstand relatively extreme temperatures, there is particular interest in replacing components within the flow path of the combustion gases with CMC materials. For example, combustor liners and the dome have surfaces and/or features exposed to or within the flow path of the combustion gases. Constructing a dome, inner liner, and outer liner from CMC materials would be beneficial, for example, by reducing weight due to the replacement of metallic components with CMC shells, using reduced cooling on the liners due to the higher material capability, and a shorter combustor configuration since the dome could be constructed with a single wall rather than a multi-wall construction.

Furthermore, an all-CMC construction of all three pieces (dome, outer liner, and inner liner) also provides advantages over solutions with CMC liners and metallic domes, such as described in U.S. Patent Publication 2017/0370583, which is incorporated herein by reference. These advantages potentially include improved airflow control in attachment gaps between the dome and the liners, reduced weight of the dome and elimination of deflectors needed to shield the dome from extreme temperatures, engine length due to single-wall dome construction, and reduced cooling on the dome due to higher material capability.

CMC components cannot, however, be coupled directly to metal components, since the expansion under high temperatures of the coupled metal components can cause the coupled CMC components to crack. Accordingly, the mounting hardware for CMC components must allow the CMC components to maintain their relative position without coming into direct contact with metal.

Examples of CMC materials utilized for such components may include silicon carbide, silicon, silica, or alumina matrix materials and combinations thereof. Ceramic fibers may be embedded within the matrix, such as oxidation stable reinforcing fibers including monofilaments such as sapphire and silicon carbide, e.g. SCS-6™ (Textron, Providence, Rhode Island, United States), as well as rovings and yarn including silicon carbide, e.g. NICALON® (Nippon Carbon, Tokyo, Japan), TYRANNO® (Ube Industries, Tokyo, Japan), and SYLRAMIC® (Dow Corning, Midland, Michigan, United States), alumina silicates, e.g. Nextel® 440 and 480 (3M, Saint Paul, Minnesota, United States), chopped whiskers and fibers, e.g. SAFFIL® (Unifrax, Tonawanda, New York, United States), ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth.

Figure 5:
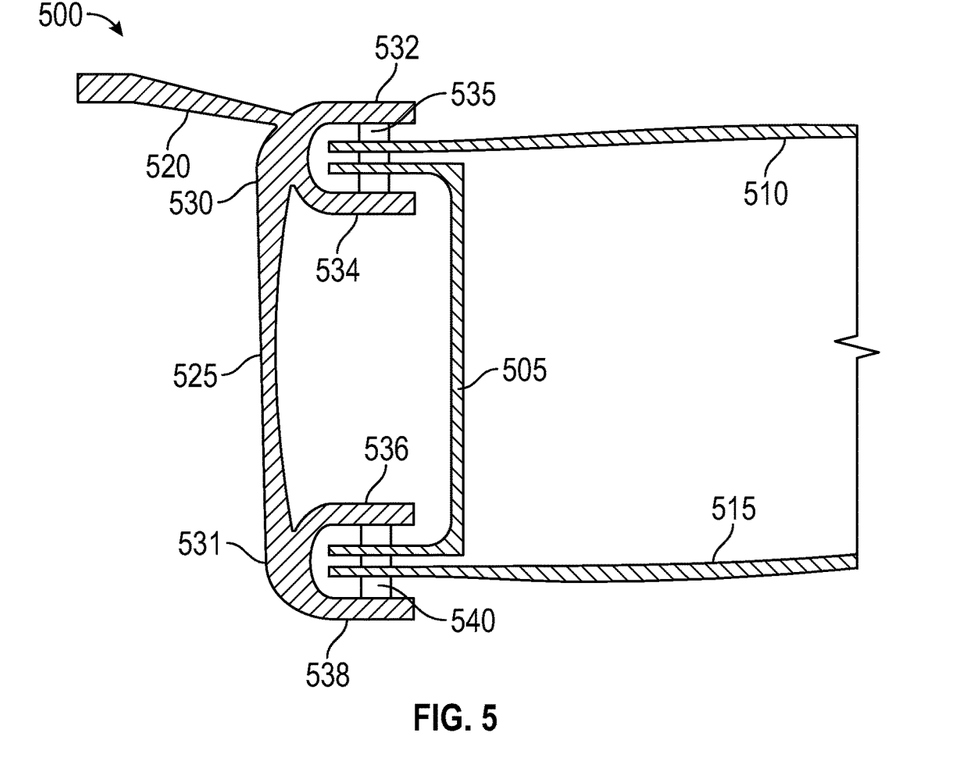
FIG. 5 schematically illustrates an embodiment of a combustor of some embodiments, in which the dome, outer liner, and inner liner are all made of CMC materials.

FIG. 5 schematically illustrates a combustor 500 of some embodiments, in which a dome 505, an outer liner 510, and an inner liner 515 are all made of CMC materials. In this example, a mounting arm 520 connects to a structural mount 525 with a dual-annulus design, having an outer channel 530 and an inner channel 531, both of which are aft-facing. Both the outer channel 530 and the inner channel 531 are coaxial, with annular symmetry around the centerline axis 220, with the outer channel 530 having a greater radius than the inner channel 531. Between the two channels, the structural mount 525 also has an aperture (not shown) for the fuel nozzle, the fuel nozzle being omitted for clarity in this view.

The outer channel 530 has an outer wall 532 and an inner wall 534, with the outer wall 532 positioned radially further from the centerline axis 220 than is the inner wall 534. An outer array 535 of fasteners couples the outer wall 532 of the outer channel 530, the outer liner 510, the dome 505, and the inner wall 534 of the outer channel 530. The outer array 535 of fasteners ensures that there is a gap on all sides between the metal inner surfaces of the outer channel 530 and the CMC surfaces of the dome 505 and the outer liner 510. This gap allows for thermal expansion of the outer channel 530 while protecting the CMC components from physical damage, by providing space for the dome 505 and the outer liner 510 to float within the outer channel 530 while maintaining separation between the dome 505, the outer liner 510, the outer wall 532 of the outer channel 530, and the inner wall 534 of the outer channel 530. Further details of the fastener hardware are described below.

Likewise, the inner channel 531 has an outer wall 536 and an inner wall 538, with the outer wall 536 positioned radially further from the centerline axis 220 than the inner wall 538. An inner array 540 of fasteners couples the outer wall 536 of the inner channel 531, the dome 505, the inner liner 515, and the inner wall 538 of the inner channel 531. The inner array 540 of fasteners ensures that there is a gap on all sides between the metal inner surfaces of the inner channel 531 and the CMC surfaces of the dome 505 and the inner liner 515. This gap allows for thermal expansion of the inner channel 531 while protecting the CMC components from physical damage, by providing space for the dome 505 and the inner liner 515 to float within the inner channel 531 while maintaining separation between the dome 505, the inner liner 515, the outer wall 536 of the inner channel 531, and the inner wall 538 of the inner channel 531. Further details of the fastener hardware are described below.

Figure 6:
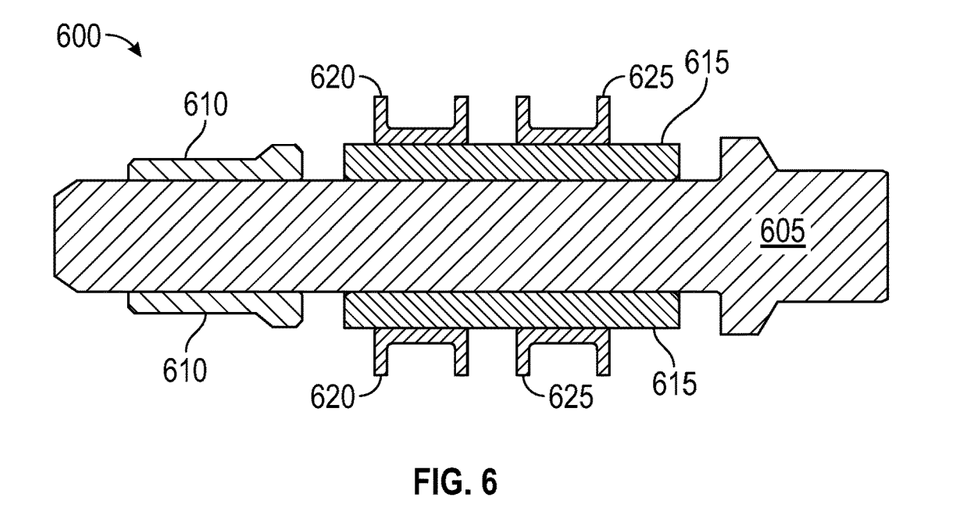
FIG. 6 illustrates a cross-sectional view of a fastener of some embodiments.

FIG. 6 illustrates a cross-sectional view of a fastener 600 of some embodiments, for use in the outer array 535 and the inner array 540. In this example, the fastener 600 is a bolt-and-nut assembly, with a bolt 605 that extends through engine components, and a nut 610 to secure the bolt 605. The bolt 605 is wrapped along its length by a bushing 615, and the bushing 615 is surrounded by one or more grommets 620, 625 that receive CMC components such as the dome 505, the outer liner 510, and the inner liner 515. In some embodiments, two grommets 620, 625 are used, each grommet having a single channel to receive a separate CMC component. In other embodiments, a single grommet with two channels may be used, with each channel receiving a separate CMC component.

The grommets 620, 625 enable the CMC components to move radially along the bushing 615 during thermal expansion of metallic components of the structural mount 525 (e.g., the outer wall 532 and the inner wall 534 of the outer channel 530, and the outer wall 536 and the inner wall 538 of the inner channel 531). The interface between the bushing 615 and the grommets 620, 625 maintains proper position of the CMC components relative to the structural mount 525 (that is made of metal) while reducing wear and preventing damage of the CMC components during engine operation.

The bolt 605 and the nut 610 in the fastener 600 may be constructed from a nickel alloy, such as Waspaloy® (United Technologies Corporation, Farmington, Connecticut). The bushing 615 may be constructed from a cobalt chromium alloy, such as Haynes® 25 (L-605) (Haynes International, Kokomo, Indiana) and the grommets 620, 625 from a cobalt alloy such as Haynes® 188 (MetalTek, Waukesha, Wisconsin, United States). Any suitable complementary metals may be chosen, however, that wear well against each other. In some embodiments, a coating is also applied to an exterior surface of the bolt 605 and/or the bushing 615, to provide additional wear protection. Suitable coating materials include TRIBALOY® T-800® (Deloro, Koblenz, Germany).

Figure 7:
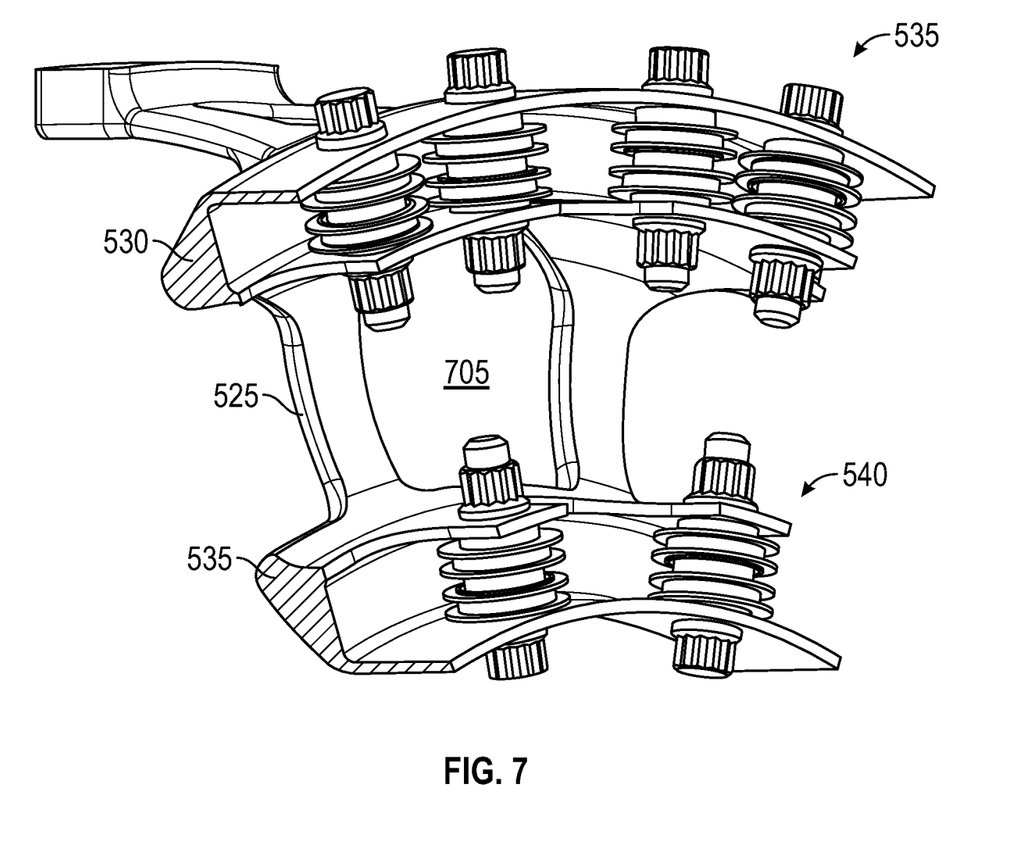
FIG. 7 schematically illustrates a perspective view of the structural mount, the outer array, and the inner array of fasteners, with the dome, inner liner, and outer liner removed for clarity.

FIG. 7 schematically illustrates a perspective view of the structural mount 525, the outer array 535, and the inner array 540 of fasteners, with the dome 505, the inner liner 515, and the outer liner 510 removed for clarity. An aperture 705 for a fuel nozzle (not shown) is also visible in this view. Only a single segment of the structural mount 525 and portions of the outer array 535 and the inner array 540 are shown, with the remainder extending circumferentially around the centerline axis 220. This perspective illustrates how the outer array 535 of fasteners penetrates the walls of the outer channel 530, and the inner array 540 of fasteners penetrates the walls of the inner channel 531.

Figure 8A:
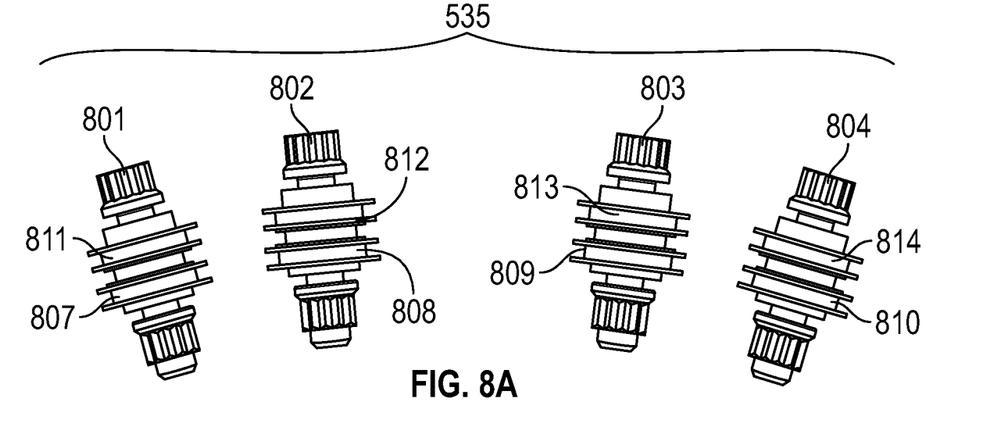
FIG. 8A illustrates the outer array of fasteners, with the structural mount removed.
Figure 8B:
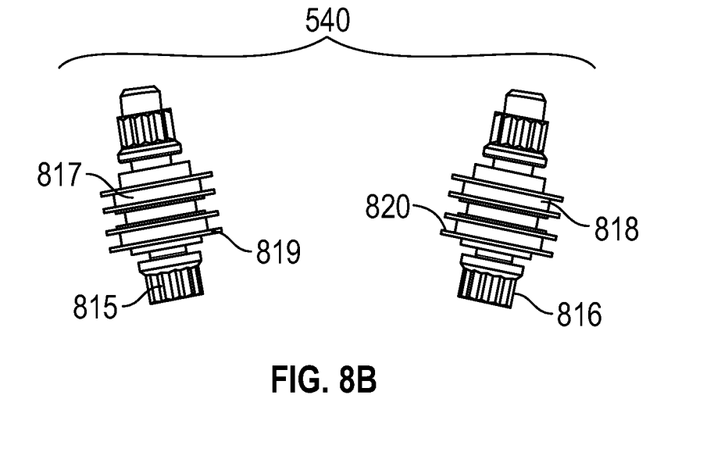
FIG. 8B illustrates the inner array of fasteners, with the structural mount removed.

FIG. 8A illustrates the outer array 535 of fasteners, and FIG. 8B illustrates the inner array 540 of fasteners, with the structural mount 525 removed. Fasteners 801, 802, 803, 804 are part of the outer array 535, and each has an inner set of grommets 807, 808, 809, 810, and an outer set of grommets 811, 812, 813, 814. Fasteners 815, 816 are part of the inner array 540, and each has an outer set of grommets 817, 818 and an inner set of grommets 819, 820. The dome 505 (not shown) is received by the inner set of grommets 807, 808, 809, 810 in the outer array 535, and the outer set of grommets 817, 818 in the inner array 540. The outer liner 510 (not shown) is received by the outer set of grommets 811, 812, 813, 814 in the outer array 535, and the inner liner 515 (not shown) is received by the inner set of grommets 819, 820 in the inner array 540. As noted above with respect to FIG. 6, the inner set of grommets and the outer set of grommets serve to maintain separation of the liners from the dome, and provide flexibility for these components to move during heat expansion of the structural mount 525, without coming into contact with metal.

Figure 9:
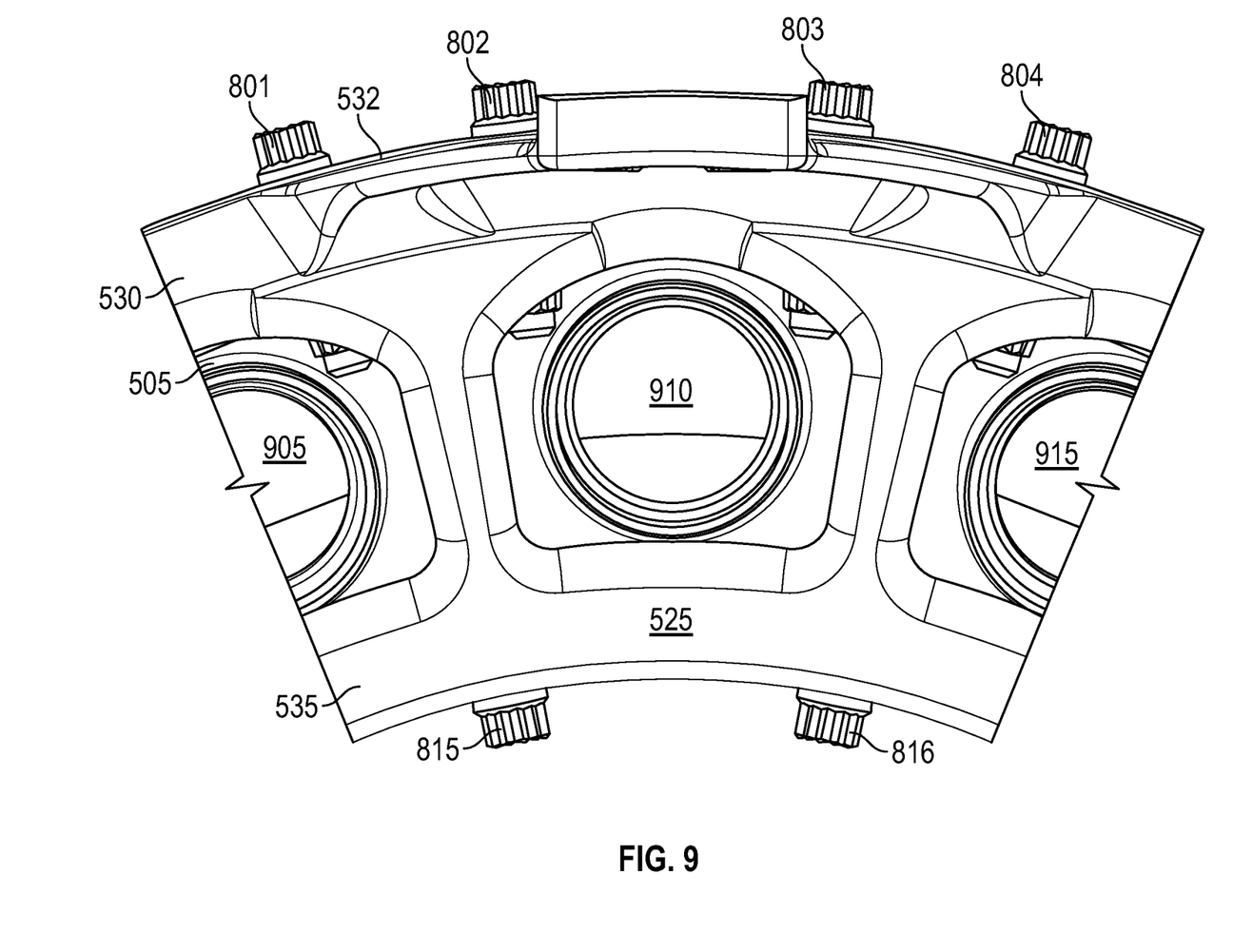
FIG. 9 illustrates an aft-facing view of the combustion chamber.

FIG. 9 illustrates an aft-facing view of the combustion chamber. In this view, the structural mount 525 is in the foreground, with portions of the dome 505 visible in the background. Three of the apertures 905, 910, 915 for fuel nozzles are visible, extending through the structural mount 525 and the dome 505. The outer liner 510 and the inner liner 515 are obscured from view by the structural mount 525. Fasteners 801 to 804 in the outer array 535 are partially visible as they extend through the outer wall 532 of the outer channel 530. Fasteners 815 and 816 in the inner array 540 are partially visible as they extend through the inner wall 538 of the inner channel 531.

Figure 10:
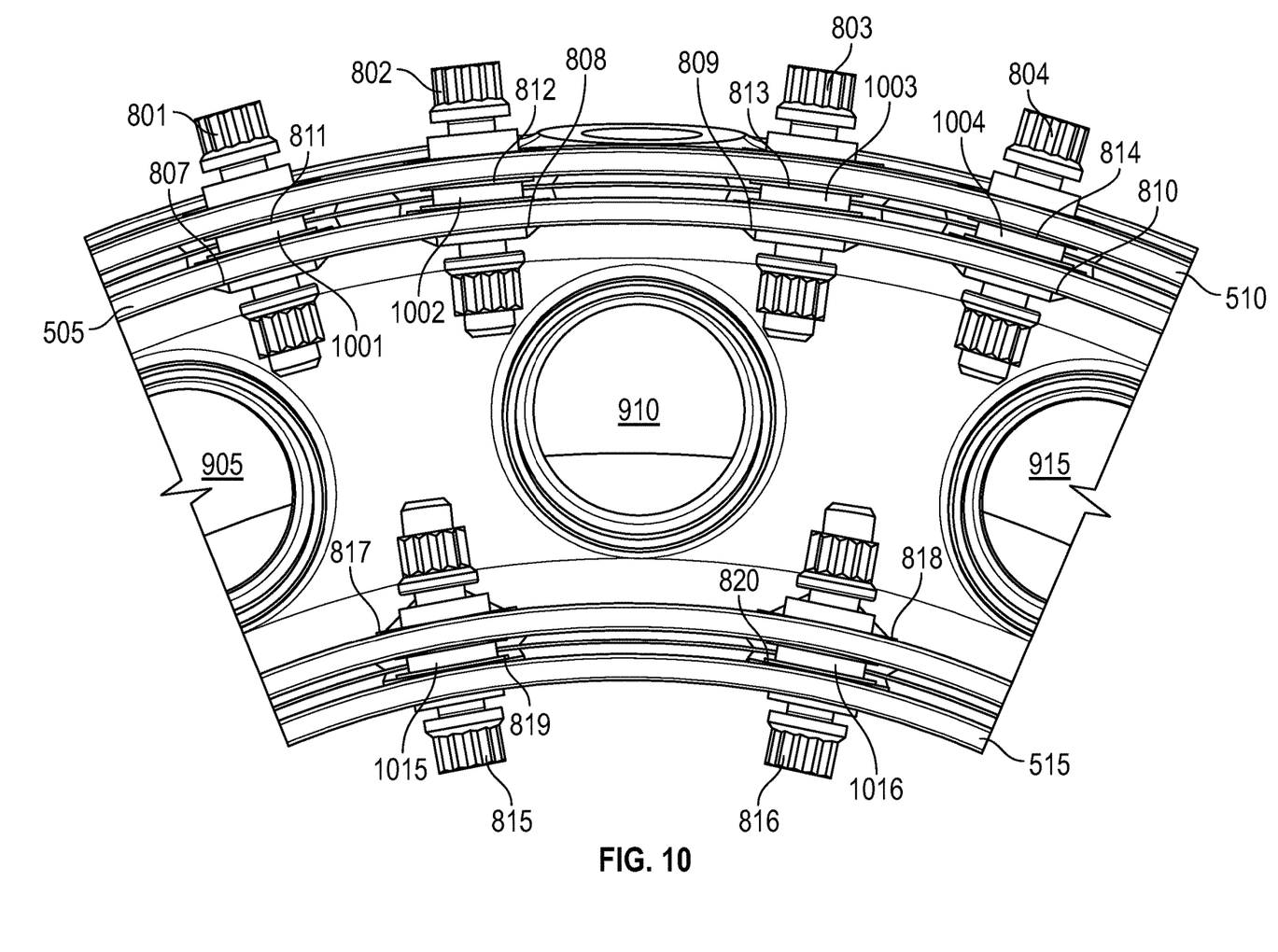
FIG. 10 illustrates an aft-facing view of the combustion chamber with the structural mount removed.

FIG. 10 illustrates an aft-facing view of the combustion chamber with the structural mount 525 removed. Three of the apertures 905, 910, 915 for fuel nozzles are visible, extending through the dome 505.

Fasteners 801 to 804 in the outer array 535 are partially visible as they extend through the outer liner 510 and the dome 505. Flanges of grommets 811 to 814 and 807 to 810 of the fasteners 801 to 804 are also visible around the edges of the outer liner 510 and the dome 505, respectively. The corresponding bushings 1001, 1002, 1003, and 1004 of the fasteners 801 to 804 are also partially visible in this view.

Fasteners 815, 816 in the inner array 540 are partially visible as they extend through the dome 505 and the inner liner 515. Flanges of grommets 817, 818, 819, 820 of the fasteners 815, 816 are also visible around the edges of the dome 505 and the inner liner 515, respectively. The corresponding bushings 1015, 1016 of the fasteners 815, 816 are also partially visible in this view.

Figure 11:
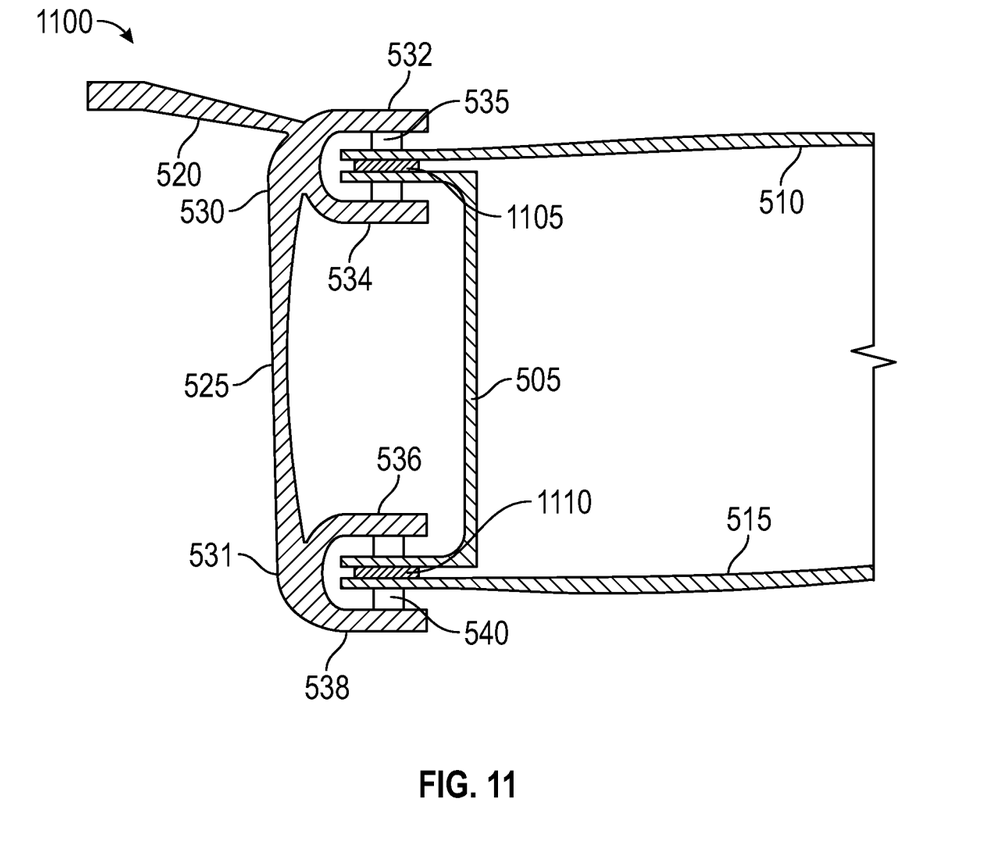
FIG. 11 schematically illustrates another combustor of some embodiments.

FIG. 11 schematically illustrates another embodiment of a combustor 1100 of some embodiments. The combustor 1100 is similar to the embodiment of combustor 500 discussed above with respect to FIGS. 5 to 10, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

In the example of FIG. 11, an outer spacer 1105 is used between the dome 505 and the outer liner 510, to provide a more precise separation between the dome 505 and the outer liner 510. Alternatively, or conjunctively, an inner spacer 1110 is used between the dome 505 and the inner liner 515, to provide a more precise separation between the dome 505 and the inner liner 515. In some embodiments, each fastener 600 in the outer array 535 and/or the inner array 540 has its own spacer that encircles the bushing 615 between the grommets 620, 625.

In some embodiments, the outer spacer 1105 may be a single integral structure with a cylindrical shape around the centerline axis 220 (not shown), with a radius greater than the radius of the dome 505 and less than the radius of the outer liner 510. The outer spacer 1105 is secured in position between the dome 505 and the outer liner 510 by the outer array 535 of fasteners.

In some embodiments, the inner spacer 1110 may be a single integral structure with a cylindrical shape around the centerline axis 220 (not shown), with a radius less than the radius of the dome 505 and greater than the radius of the inner liner 515. The inner spacer 1110 is secured in position between the dome 505 and the inner liner 515 by the inner array 540 of fasteners.

Further aspects of the present disclosure are provided by the subject matter of the following clauses.

A combustor for a turbomachine engine includes a dome made of a ceramic matrix composite (CMC) material, the dome being secured within a support structure. The combustor also includes an outer liner made of the CMC material, the outer liner being secured to the dome within the support structure, and an inner liner made of the CMC material, the inner liner being secured to the dome within the support structure.

The combustor of the preceding clause, wherein the outer liner and the inner liner have a cylindrical shape around a centerline axis of the turbomachine engine, a radius of the outer liner being greater than a radius of the inner liner.

The combustor of any preceding clause, wherein the support structure is made of metal and comprises an outer channel and an inner channel, the outer channel and the inner channel each having an annular shape around the centerline axis, a radius of the outer channel being greater than a radius of the inner channel. The outer liner and a first section of the dome are secured within the outer channel by a first array of fasteners, and the inner liner and a second section of the dome are secured within the inner channel by a second array of fasteners.

The combustor of any preceding clause, further including a wear coating applied to at least one exterior surface of one or more fasteners.

The combustor of any preceding clause, wherein the outer channel of the support structure has an outer wall and an inner wall, and at least one fastener in the first array of fasteners has a metal bolt that penetrates the outer wall, the outer liner, the dome, and the inner wall, and a bushing that sleeves the metal bolt between the outer wall and the inner wall.

The combustor of any preceding clause, wherein at least one fastener in the first array of fasteners further has at least one grommet that encircles at least a first portion of the bushing, the grommet being made of a chromium nickel alloy, and the bushing being made of a cobalt molybdenum chromium alloy.

The combustor of any preceding clause, wherein at least one fastener in the first array of fasteners further has an outer grommet that encircles a first portion of the bushing to receive the outer liner and an inner grommet that encircles a second portion of the bushing to receive the dome.

The combustor of any preceding clause, wherein at least one fastener in the first array of fasteners further has a spacer that encircles a third portion of the bushing between the inner grommet and the outer grommet.

The combustor of any preceding clause, further including a spacer that is secured within the outer channel by the first array of fasteners, the spacer having a cylindrical shape around the centerline axis and being positioned between the outer liner and the dome. A radius of the spacer is less than the radius of the outer liner.

The combustor of any preceding clause, wherein at least one fastener in the first array of fasteners further has a grommet that encircles the bushing, the grommet having a first channel to receive the outer liner and a second channel to receive the dome.

The combustor of any preceding clause, wherein the inner channel of the support structure has an outer wall and an inner wall, and at least one fastener in the second array of fasteners has a metal bolt that penetrates the outer wall, the dome, the inner liner, and the inner wall, and a bushing that sleeves the metal bolt between the outer wall and the inner wall.

The combustor of any preceding clause, wherein at least one fastener in the second array of fasteners further has at least one grommet that encircles at least a first portion of the bushing, the grommet being made of a chromium nickel alloy, and the bushing being made of a cobalt molybdenum chromium alloy.

The combustor of any preceding clause, wherein at least one fastener in the second array of fasteners further has an outer grommet that encircles a first portion of the bushing to receive the dome, and an inner grommet that encircles a second portion of the bushing to receive the inner liner.

The combustor of any preceding clause, wherein at least one fastener in the second array of fasteners further has a spacer that encircles a third portion of the bushing between the inner grommet and the outer grommet.

The combustor of any preceding clause, further including a spacer that is secured within the inner channel by the second array of fasteners, the spacer having a cylindrical shape around the centerline axis and being positioned between the dome and the inner liner. A radius of the spacer is greater than the radius of the inner liner.

The combustor of any preceding clause, wherein at least one fastener in the second array of fasteners further has a grommet that encircles the bushing, the grommet having a first channel to receive the dome and a second channel to receive the inner liner.

A turbomachine engine includes a fan assembly that provides intake air to a compressor section, a turbine section that drives the compression section, and a combustor arranged to receive compressed air from the compressor section and to provide hot gas to the turbine section. The combustor includes a dome made of a ceramic matrix composite (CMC) material, the dome being secured within a support structure. The combustor also includes an outer liner made of the CMC material, the outer liner being secured to the dome within the support structure, and an inner liner made of the CMC material, the inner liner being secured to the dome within the support structure.

The turbomachine engine of the preceding clause, wherein the support structure is made of metal and has an outer channel and an inner channel, the outer liner and the inner liner having a cylindrical shape around a centerline axis of the turbomachine engine, and the outer channel and the inner channel each having an annular shape around the centerline axis. A radius of the outer liner is greater than a radius of the inner liner, and a radius of the outer channel is greater than a radius of the inner channel. The outer liner and a first section of the dome are secured within the outer channel by a first array of fasteners, and the inner liner and a second section of the dome are secured within the inner channel by a second array of fasteners.

The turbomachine engine of any preceding clause, wherein the outer channel of the support structure has an outer wall and an inner wall, and at least one fastener in the first array of fasteners includes (i) a metal bolt that penetrates the outer wall, the outer liner, the dome, and the inner wall, (ii) a bushing that sleeves the metal bolt between the outer wall and the inner wall, (iii) an outer grommet that encircles a first portion of the bushing to receive the outer liner, and (iv) an inner grommet that encircles a second portion of the bushing to receive the dome.

The turbomachine engine of any preceding clause, wherein the inner channel of the support structure has an outer wall and an inner wall, and at least one fastener in the second array of fasteners includes (i) a metal bolt that penetrates the outer wall, the dome, the inner liner, and the inner wall, (ii) a bushing that sleeves the metal bolt between the outer wall and the inner wall, (iii) an outer grommet that encircles a first portion of the bushing to receive the dome, and an inner grommet that encircles a second portion of the bushing to receive the inner liner.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A combustor for a turbomachine engine, the combustor comprising:
   a support structure made of metal and comprising an outer channel, an inner channel, and a structural mount defining a forward end of the outer channel and a forward end of the inner channel, the structural mount extending from the forward end of the outer channel to the forward end of the inner channel;
   a dome made of a ceramic matrix composite (CMC) material and being secured within the support structure, wherein an outer end of the dome is secured within the outer channel and an inner end of the dome is secured within the inner channel;
   an outer liner made of the CMC material, the outer liner being secured to the dome within the support structure, wherein the outer liner is secured to the support structure at the outer end of the dome; and
   an inner liner made of the CMC material, the inner liner being secured to the dome within the support structure, wherein the inner liner is secured to the support structure at the inner end of the dome.

2. The combustor of claim 1, wherein the outer liner and the inner liner have a cylindrical shape around a centerline axis of the combustor, a radius of the outer liner being greater than a radius of the inner liner.

3. The combustor of claim 2, wherein the outer channel and the inner channel each have an annular shape around the centerline axis, a radius of the outer channel being greater than a radius of the inner channel,
   wherein the outer liner is secured to the outer end of the dome within the outer channel by a first array of fasteners, and
   wherein the inner liner is secured to the inner end of the dome within the inner channel by a second array of fasteners.

4. The combustor of claim 3, further comprising a wear coating applied to at least one exterior surface of one or more fasteners.

5. The combustor of claim 3, wherein the outer channel of the support structure comprises an outer wall and an inner wall, and wherein at least one fastener in the first array of fasteners comprises (a) a metal bolt that penetrates the outer wall, the outer liner, the outer end of the dome, and the inner wall, and (b) a bushing that sleeves the metal bolt between the outer wall and the inner wall.

6. The combustor of claim 5, wherein the at least one fastener in the first array of fasteners further comprises (c) at least one grommet that encircles at least a first portion of the bushing, the at least one grommet being made of a chromium nickel alloy, and the bushing being made of a cobalt molybdenum chromium alloy.

7. The combustor of claim 5, wherein the at least one fastener in the first array of fasteners further comprises (c) an outer grommet that encircles a first portion of the bushing to receive the outer liner and (d) an inner grommet that encircles a second portion of the bushing to receive the dome.

8. The combustor of claim 7, wherein the at least one fastener in the first array of fasteners further comprises (e) a spacer that encircles a third portion of the bushing between the inner grommet and the outer grommet.

9. The combustor of claim 7, further comprising a spacer that is secured within the outer channel by the first array of fasteners, the spacer having a cylindrical shape around the centerline axis and being positioned between the outer liner and the dome, wherein a radius of the spacer is less than the radius of the outer liner.

10. The combustor of claim 5, wherein the at least one fastener in the first array of fasteners further comprises (c) a grommet that encircles the bushing, the grommet comprising a first channel to receive the outer liner and a second channel to receive the dome.

11. The combustor of claim 3, wherein the inner channel of the support structure comprises an outer wall and an inner wall, and wherein at least one fastener in the second array of fasteners comprises (a) a metal bolt that penetrates the outer wall, the inner end of the dome, the inner liner, and the inner wall, and (b) a bushing that sleeves the metal bolt between the outer wall and the inner wall.

12. The combustor of claim 11, wherein the at least one fastener in the second array of fasteners further comprises (c) at least one grommet that encircles at least a first portion of the bushing, the at least one grommet being made of a chromium nickel alloy, and the bushing being made of a cobalt molybdenum chromium alloy.

13. The combustor of claim 11, wherein the at least one fastener in the second array of fasteners further comprises (c) an outer grommet that encircles a first portion of the bushing to receive the dome, and (d) an inner grommet that encircles a second portion of the bushing to receive the inner liner.

14. The combustor of claim 13, wherein the at least one fastener in the second array of fasteners further comprises (e) a spacer that encircles a third portion of the bushing between the inner grommet and the outer grommet.

15. The combustor of claim 13, further comprising a spacer that is secured within the inner channel by the second array of fasteners, the spacer having a cylindrical shape around the centerline axis and being positioned between the dome and the inner liner, wherein a radius of the spacer is greater than the radius of the inner liner.

16. The combustor of claim 11, wherein the at least one fastener in the second array of fasteners further comprises (c) a grommet that encircles the bushing, the grommet comprising a first channel to receive the dome and a second channel to receive the inner liner.

17. A turbomachine engine comprising:
   (A) a fan assembly that provides intake air to a compressor section;
   (B) a turbine section that drives the compression section; and
   (C) a combustor arranged to receive compressed air from the compressor section and to provide hot gas to the turbine section, the combustor comprising:
      (a) a support structure made of metal and comprising an outer channel, an inner channel, and a structural mount defining a forward end of the outer channel and a forward end of the inner channel, the structural mount extending from the forward end of the outer channel to the forward end of the inner channel;
      (b) a dome made of a ceramic matrix composite (CMC) material and being secured within the support structure of the combustor, wherein an outer end of the dome is secured within the outer channel and an inner end of the dome is secured within the inner channel;
      (c) an outer liner made of the CMC material, the outer liner being secured to the dome within the support structure, wherein the outer liner is secured to the support structure at the outer end of the dome; and (d) an inner liner made of the CMC material, the inner liner being secured to the dome within the support structure, wherein the inner liner is secured to the support structure at the inner end of the dome.

18. The turbomachine engine of claim 17, wherein the outer liner and the inner liner each have a cylindrical shape around a centerline axis of the turbomachine engine, and the outer channel and the inner channel each have an annular shape around the centerline axis, wherein a radius of the outer liner is greater than a radius of the inner liner, wherein a radius of the outer channel is greater than a radius of the inner channel, wherein the outer liner is secured to the outer end of the dome within the outer channel by a first array of fasteners, and wherein the inner liner is secured to the inner end of the dome within the inner channel by a second array of fasteners.

19. The turbomachine engine of claim 18, wherein the outer channel of the support structure comprises an outer wall and an inner wall, and at least one fastener in the first array of fasteners comprises:

(i) a metal bolt that penetrates the outer wall, the outer liner, the outer end of the dome, and the inner wall;
(ii) a bushing that sleeves the metal bolt between the outer wall and the inner wall;
(iii) an outer grommet that encircles a first portion of the bushing to receive the outer liner; and
(iv) an inner grommet that encircles a second portion of the bushing to receive the dome.

20. The turbomachine engine of claim 18, wherein the inner channel of the support structure comprises an outer wall and an inner wall, and at least one fastener in the second array of fasteners comprises:

(i) a metal bolt that penetrates the outer wall, the inner end of the dome, the inner liner, and the inner wall;
(ii) a bushing that sleeves the metal bolt between the outer wall and the inner wall;
(iii) an outer grommet that encircles a first portion of the bushing to receive the dome; and
(iv) an inner grommet that encircles a second portion of the bushing to receive the inner liner.

* * * * *